United States Patent
Kim et al.

(10) Patent No.: US 11,743,331 B2
(45) Date of Patent: *Aug. 29, 2023

(54) SYSTEM, MOBILE TERMINAL AND METHOD FOR STORING DATA INTO WEB STORAGE USING WIRELESS LAN

(71) Applicant: Samsung Electronics Co., Ltd., Gyeonggi-do (KR)

(72) Inventors: Jong Ryul Kim, Seoul (KR); Woo Soon Park, Seoul (KR); Jong Jin Choi, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 17/961,714

(22) Filed: Oct. 7, 2022

(65) Prior Publication Data

US 2023/0032687 A1 Feb. 2, 2023

Related U.S. Application Data

(63) Continuation of application No. 16/929,609, filed on Jul. 15, 2020, now Pat. No. 11,470,151, which is a (Continued)

(30) Foreign Application Priority Data

Jul. 10, 2006 (KR) .............................. 2006-0064631

(51) Int. Cl.
*G06F 13/00* (2006.01)
*H04L 67/1095* (2022.01)
(Continued)

(52) U.S. Cl.
CPC .......... *H04L 67/1095* (2013.01); *H04L 67/04* (2013.01); *H04L 67/06* (2013.01);
(Continued)

(58) Field of Classification Search
CPC ..... H04L 67/1095; H04L 67/04; H04L 67/06; H04L 63/083; H04W 12/068;
(Continued)

(56) References Cited

U.S. PATENT DOCUMENTS 6,351,776 B1 2/2002 O'Brien et al.
6,795,700 B2 9/2004 Karaoguz
(Continued)

FOREIGN PATENT DOCUMENTS

CN 1592464 3/2005
EP 1 104 976 6/2001
(Continued)

OTHER PUBLICATIONS

Chen et al., "Algorithms for supporting disconnected write operations for wireless Web access in mobile client-server environments," IEEE Transactions on Mobile Computing, vol. 1, No. 1, pp. 46-58, Jan.-Mar. 2002.

(Continued)

*Primary Examiner* — Kenneth R Coulter
(74) *Attorney, Agent, or Firm* — The Farrell Law Firm, P.C.

(57) ABSTRACT

A method and a mobile terminal are provided in which a first user interface is provided by which a user selects a first setting indicating whether still images stored in the mobile terminal are to be stored in a web server. A second user interface is provided by which the user selects a second setting indicating whether the still images are to be transmitted to the web server via a wireless local area network (LAN) if the mobile terminal enters a wireless LAN service area. If the second setting indicates that the still images are to be transmitted if the mobile terminal enters the wireless LAN service area, the still images are transmitted to the web (Continued)

server via the wireless LAN if the mobile terminal enters a service area of the wireless LAN.

13 Claims, 4 Drawing Sheets

Related U.S. Application Data continuation of application No. 11/771,866, filed on Jun. 29, 2007, now abandoned.

(51) Int. Cl.
*H04W 76/45* (2018.01)
*H04L 67/06* (2022.01)
*H04L 67/04* (2022.01)
*H04W 12/06* (2021.01)
*H04W 76/19* (2018.01)
*H04W 68/00* (2009.01)
*H04L 9/40* (2022.01)
*G06F 3/04847* (2022.01)
*H04W 84/12* (2009.01)

(52) U.S. Cl.
CPC ......... *H04W 12/068* (2021.01); *H04W 68/00* (2013.01); *H04W 76/19* (2018.02); *H04W 76/45* (2018.02); *G06F 3/04847* (2013.01); *H04L 63/083* (2013.01); *H04W 84/12* (2013.01)

(58) Field of Classification Search
CPC ..... H04W 68/00; H04W 76/19; H04W 76/45; H04W 84/12; G06F 3/04847
USPC ................ 709/227–229, 217–219, 203, 250; 726/2–5; 715/748
See application file for complete search history.

(56) References Cited

U.S. PATENT DOCUMENTS

| 6,842,770 | B1 | 1/2005 | Serlet et al. |
| 7,158,797 | B1 | 1/2007 | Jayaraman |
| 7,221,961 | B1 | 5/2007 | Fukumoto et al. |
| 7,243,163 | B1 | 7/2007 | Friend et al. |
| 7,814,195 | B2* | 10/2010 | Dacosta .............. H04L 67/1095 709/224 |
| 8,121,088 | B2 | 2/2012 | Kim |
| 8,151,259 | B2* | 4/2012 | Fadell ................... G06F 16/178 719/321 |
| 8,538,433 | B2 | 9/2013 | Kekki |
| 11,470,151 | B2* | 10/2022 | Kim ....................... H04L 67/04 |
| 2002/0010696 | A1 | 1/2002 | Izumi |
| 2002/0030750 | A1 | 3/2002 | Mizutani |
| 2002/0078176 | A1 | 6/2002 | Nomura et al. |
| 2002/0120696 | A1 | 8/2002 | Mousseau et al. |
| 2003/0179531 | A1 | 9/2003 | Yamaguchi |
| 2003/0204624 | A1 | 10/2003 | Kushner |
| 2004/0051741 | A1 | 3/2004 | Venturino |
| 2004/0062227 | A1 | 4/2004 | Sayeedi |
| 2005/0021497 | A1 | 1/2005 | Kohno |
| 2005/0050117 | A1 | 3/2005 | Seo et al. |
| 2005/0088989 | A1 | 4/2005 | Lee et al. |
| 2005/0117566 | A1 | 6/2005 | Davidson |
| 2005/0143094 | A1 | 6/2005 | Reed et al. |
| 2006/0041600 | A1 | 2/2006 | Lehtola et al. |
| 2006/0056336 | A1 | 3/2006 | Dacosta |
| 2006/0069769 | A1 | 3/2006 | Dacosta |
| 2006/0129931 | A1 | 6/2006 | Simons |
| 2006/0182054 | A1 | 8/2006 | Islam et al. |
| 2006/0183475 | A1 | 8/2006 | Willey et al. |
| 2006/0189348 | A1 | 8/2006 | Montulli |
| 2006/0242206 | A1 | 10/2006 | Brezak et al. |
| 2007/0105532 | A1 | 5/2007 | Martin et al. |
| 2007/0169087 | A1 | 7/2007 | Fadell |
| 2008/0080417 | A1 | 4/2008 | Kim |
| 2010/0195621 | A1 | 8/2010 | Kekki |

FOREIGN PATENT DOCUMENTS

| FR | 2864413 | 6/2005 |
| KR | 10-2002-0042273 | 5/2002 |
| KR | 10-2004-0069574 | 1/2003 |
| KR | 10-2004-0002034 | 1/2004 |
| KR | 10-2005-0040875 | 5/2005 |
| KR | 10-2006-0054527 | 5/2006 |
| WO | WO 03/007639 | 1/2003 |
| WO | WO 2005/069651 | 7/2005 |

OTHER PUBLICATIONS

Jungle Disk, May 2006.
European Search Report dated May 28, 2019 issued in counterpart application No. 19165309.6-1218, 11 pages.
European Search Report dated Nov. 15, 2016 issued in counterpart application No. 16188971.2-1870, 6 pages.
European Search Report dated Nov. 17, 2017 issued in counterpart application No. 17194239.4-1870, 6 pages.

* cited by examiner

SYSTEM, MOBILE TERMINAL AND METHOD FOR STORING DATA INTO WEB STORAGE USING WIRELESS LAN

PRIORITY

This application is a Continuation Application of U.S. patent application Ser. No. 16/929,609, filed in the U.S. Patent and Trademark Office (USPTO) on Jul. 15, 2020, now U.S. Pat. No. 11,470,151, issued on Oct. 11, 2022, which is a Continuation Application of U.S. patent application Ser. No. 11/771,866, filed in the USPTO on Jun. 29, 2007, which claims priority under 35 U.S.C. § 119(a) to Korean Pat. App. Ser. No. 2006-0064631, filed in the Korean Intellectual Property Office on Jul. 10, 2006, the contents of each of which are incorporated herein by reference.

BACKGROUND

1. Field of the Invention

The present invention relates to a system, mobile terminal and method for storing data in a web storage using a wireless Local Area Network (LAN) service, and in particular, to a system and method for storing data stored in a mobile terminal into a web storage using a wireless LAN service when the mobile terminal enters a wireless LAN service area, and to a mobile terminal using the method.

2. Description of the Related Art

Nowadays, using only mobile terminals, users can use various additive functions, for example games, a digital camera, an MP3 player, a scheduler, a housekeeping book and directory functions. Among the functions, users mainly use high-capacity services based on multimedia data, for example, games, still image data, moving image data and MP3 music data. However, mobile terminals have relatively small storage spaces compared with the high-capacity services, and thus the mobile terminals have a limitation in storing multimedia data.

In order to improve a multimedia data storage rate of a mobile terminal, various techniques have been introduced, for example, to expand the capacity of an internal memory of a mobile terminal, mounting a memory card externally on a mobile terminal, transmitting data of a mobile terminal to a Personal Computer (PC) using a Universal Serial Bus (USB) cable, and storing mobile terminal data on the Internet through a wireless Internet connection.

However, expanding the capacity of an internal memory has a problem of increased size of a mobile terminal caused by expansion of the size of the internal memory. Mounting a memory card externally on a mobile terminal has a problem of carrying the mobile terminal with a memory card so as to use multimedia data stored in the memory card. Transmitting mobile terminal data to a PC using a USB cable has a problem of carrying the mobile terminal with a USB cable for connecting to a PC so as to store data stored in the mobile terminal into the PC, otherwise it is impossible to store data in a PC, and the PC also needs to be turned on and be connected to the USB cable. Storing mobile terminal data on the Internet has a relatively slower data transmission speed than transmitting mobile terminal data to a PC, and requires connection to a wireless Internet for data transmission, thereby increasing costs.

SUMMARY

The present invention is made to solve the above-mentioned problems, and therefore, the present invention provides a system, mobile terminal and method for expanding a space for storing a high-capacity service to a web storage, thereby reducing a storage space limitation.

The present invention further provides a system, mobile terminal, and method for reducing the quantity of portable equipments required to use multimedia data stored in an external storage device.

The present invention further provides a system and method for simplifying a procedure for storing mobile terminal data into a web storage, and a mobile terminal thereof.

The present invention further provides a system and method for storing mobile terminal data into a web storage using a wireless LAN service, thereby reducing costs, and a mobile terminal thereof.

The present invention provides a system and method for storing mobile terminal data into a web storage using a wireless LAN service, and a mobile terminal thereof.

A system according to the present invention includes a mobile terminal for sensing entry to a wireless LAN service area to use a wireless LAN service, a wireless connection device for setting the wireless LAN service area, a web server providing a web storage for storing mobile terminal data, and a broadband network for connecting the mobile terminal to the web server.

The mobile terminal may be synchronized with the web server to transmit data stored in the mobile terminal to the web server when entering the wireless LAN service area.

The mobile terminal may set data to be stored into the web storage, wherein the storable data may be, for example, a directory, moving image data, still image data and MP3 music data.

The web server may store data transmitted from the mobile terminal into the web storage.

In accordance with an embodiment of the present invention, a mobile terminal is provided that includes a memory, a display, a transceiver, and a processor. The processor is configured to control the memory to store a setting indicating whether still images stored in the mobile terminal are to be transmitted to a web server via a wireless LAN if the mobile terminal enters a wireless LAN service area. If the setting indicates that still images stored in the mobile terminal are to be transmitted to the web server via a wireless LAN, the processor is configured to control the transceiver to transmit the still images stored in the mobile terminal to the web server via a wireless LAN if the mobile terminal enters a wireless LAN service area.

In accordance with another embodiment of the present invention, a method for a mobile terminal is provided. A user identification and a password are received from a user. The user identification and the password are associated with a user account and a web server which stores data associated with the user account. A first selection of a first setting, is received from the user, indicating whether still images stored in the mobile terminal are to be stored in the web server associated with the user account. A second selection of a second setting, is received from the user, indicating, if the first setting indicates that the still images stored in a memory of the mobile terminal are also to be stored in the web server, whether the still images stored in the memory of the mobile terminal are to be transmitted to the web server via a wireless LAN if the mobile terminal enters a wireless LAN service area. In case that the second setting indicates that the still images stored in the mobile terminal are to be transmitted to the web server via the wireless LAN if the mobile terminal enters the wireless LAN service area, the still images stored in the mobile terminal are transmitted to the web server via the wireless LAN if the mobile terminal enters a service area of the wireless LAN.

BRIEF DESCRIPTION OF THE DRAWINGS

The objects, features, and advantages of the present invention will become more apparent from the following detailed description in conjunction with the accompanying drawings, in which.

DETAILED DESCRIPTION

Figure 1:
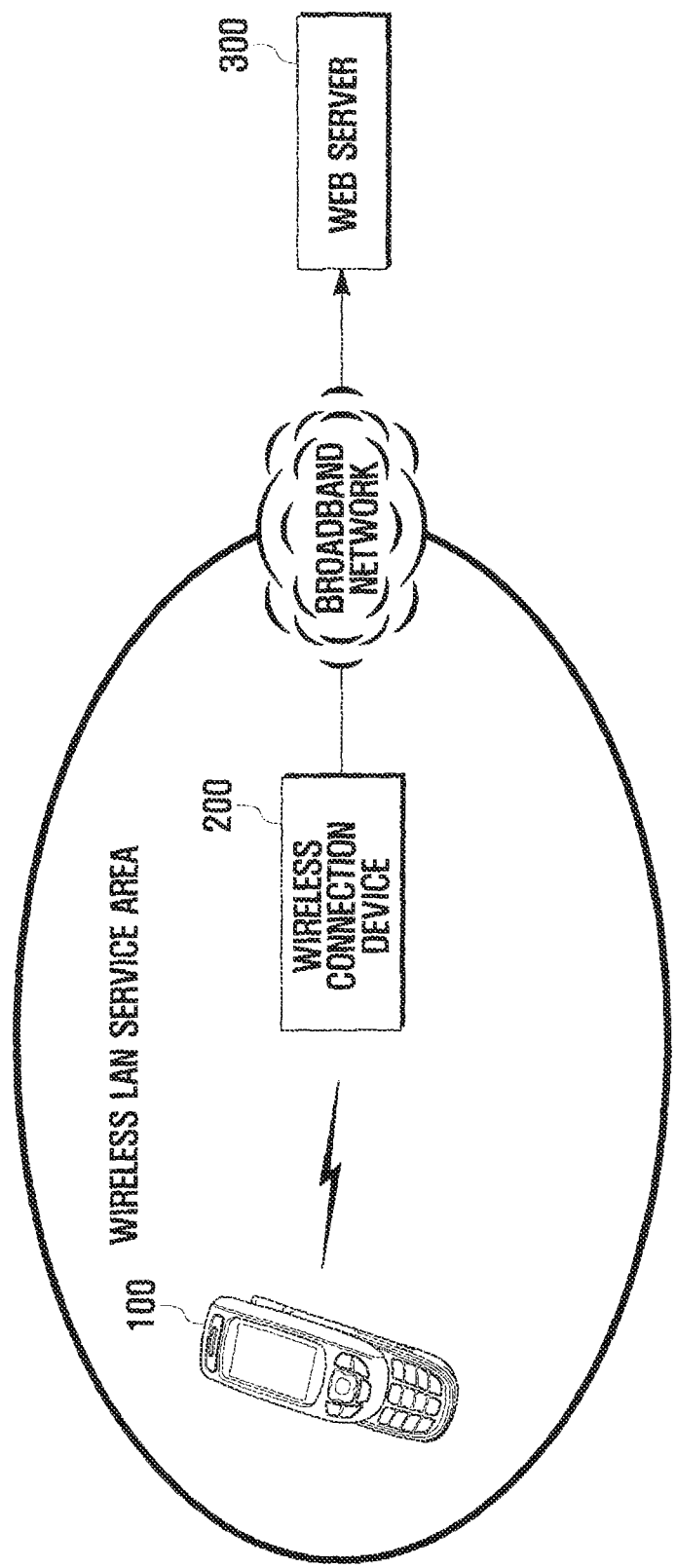
FIG. 1 is a schematic view of a system for storing data into a web storage using a wireless LAN service according to an exemplary embodiment of the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Referring to FIG. 1, the system includes a mobile terminal 100, a wireless connection device 200, and a web server 300.

Figure 2:
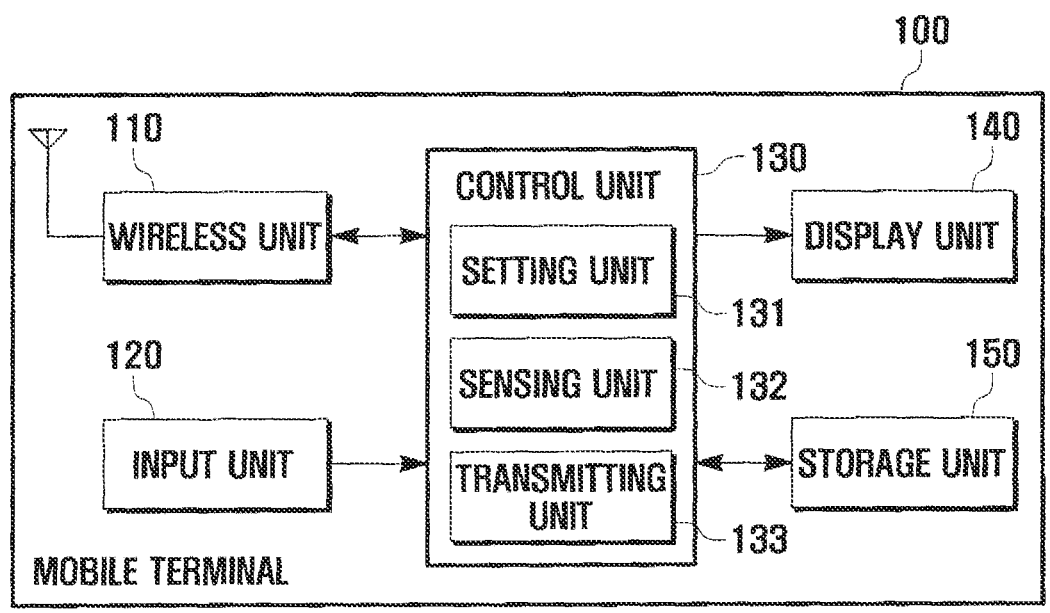
FIG. 2 is a block diagram illustrating a main configuration of a mobile terminal according to an exemplary embodiment of the present invention.

The mobile terminal 100 has a wireless LAN card therein to use a wireless LAN service, and transmits data stored therein to the web server 300 using the wireless LAN service. For this purpose, as shown in FIG. 2, the mobile terminal 100 preferably includes a wireless unit 110; an input unit 120; a control unit 130, which includes a setting unit 131, a sensing unit 132, and a transmitting unit 133; a display unit 140; and a storage unit 150.

The wireless connection device 200 is installed to set a wireless LAN service area. The wireless LAN service area is an area where a wireless LAN service is available, and covers a predetermined distance from a location where the wireless connection device 200 is installed.

Figure 3:
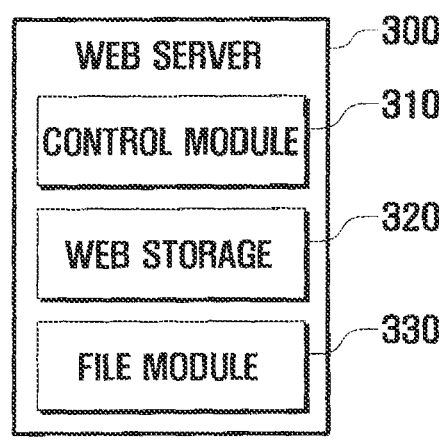
FIG. 3 is a block diagram illustrating a main configuration of a web server according to an exemplary embodiment of the present invention.

The web server 300 provides a web storage service for storing data of the mobile terminal 100. For this purpose, as shown in FIG. 3, the web server 300 preferably includes a control module 310, a web storage 320 and a file module 330.

A main configuration of the mobile terminal 100 is described in detail with reference to FIG. 2. The wireless unit 110 executes wireless communications between the mobile terminal 100 and a mobile network. For example, the wireless unit 110 transmits and receives voice data, text messages and multimedia messages through a wireless network.

The input unit 120 may include keypads, touch screens, touch pads or scroll wheels, and receives operating signals input by a user for controlling an operation of the mobile terminal 100 and provides the operating signals to the control unit 130.

The control unit 130 controls the whole operation to be executed through units of the mobile terminal 100. In particular, the control unit 130 sets synchronization of the web server 300 and the mobile terminal 100, obtains member authentication from the web server 300, and transmits data of the mobile terminal 100 to the web server 300. For this purpose, the control unit 130 preferably includes the setting unit 131, the sensing unit 132 and the transmitting unit 133.

The setting unit 131 sets synchronization of the web server 300 and the mobile terminal 100 including a hot key, a callback Uniform Resource Locator (URL), URL address of the web server 300, etc. The setting unit 131 also sets a specific data stored in the mobile terminal 100 to be stored into the web storage 320. For example, the specific data may be directory data, moving image data, still image data, or MP3 music data. The setting unit 131 also sets a user ID and password by subscribing to the web server 300 to store the specific data into the web storage 320.

The sensing unit 132 senses whether the mobile terminal 100 enters or exits a wireless LAN service area by sensing signals of the wireless connection device 200.

When the sensing unit 132 senses that the mobile terminal 100 enters a wireless LAN service area, the transmitting unit 133 transmits data of the mobile terminal 100 set by the setting unit 131 to the web server 300 through a broadband network. When the sensing unit 132 senses that the mobile terminal 100 exits the wireless LAN service area during data transmission to the web server 300, the transmitting unit 133 stops transmission of the data of the mobile terminal 100. Thereafter, if the sensing unit 132 senses that the mobile terminal 100 reenters the wireless LAN service area, the transmitting unit 133 retransmits the data, transmission of which to the web server 300 was stopped due to the mobile terminal 100 exiting the wireless LAN service area, from a stopped portion of transmitted data or from a start of the data transmission.

The display unit 140 displays the state and result of various operations executed in units of the mobile terminal 100, and a plurality of information, by control of the control unit 130. Particularly, when data of the mobile terminal 100 set by the setting unit 131 is completely stored into the web storage 320, the display unit 140 displays a storage completion message. When the mobile terminal 100 exits the wireless LAN service area, the display unit 140 displays a warning message informing that data transmission has stopped. If the mobile terminal 100 reenters the wireless LAN service area, the display unit 140 displays a message to select whether the transmitting unit 133 should retransmit the data whose transmission was stopped from a stopped portion of the data or from the start of the data.

The storage unit 150 stores data (for example, a setting state or data about a menu) related to operation of the mobile terminal 100 by control of the control unit 130. The storage unit 150 also stores a hot key, a callback URL, and URL address of the web server 300 for setting synchronization of the web server 300 with the mobile terminal 100 by the setting unit 131, and stores specific data of the mobile terminal 100 to be stored into the web storage 320 provided by the web server 300. The storage unit 150 also stores the user ID and password required for connection to the web server 300 set by the setting unit 131.

Referring to FIG. 3, the control module 310 controls the whole operation to be executed in the units of the web server 300. Particularly, the control module 310 executes member authentication through the user ID and password set in the mobile terminal 100.

The web storage 320 stores data of the mobile terminal 100 transmitted to the web server 300 through a broadband network by control of the control module 310.

In the case that specific data stored in the web storage 320 is lost or damaged, the file module 330 executes a system file check by changing the name of the data and restoring the data into a stored version of the data by control of the control module 310.

Figure 4:
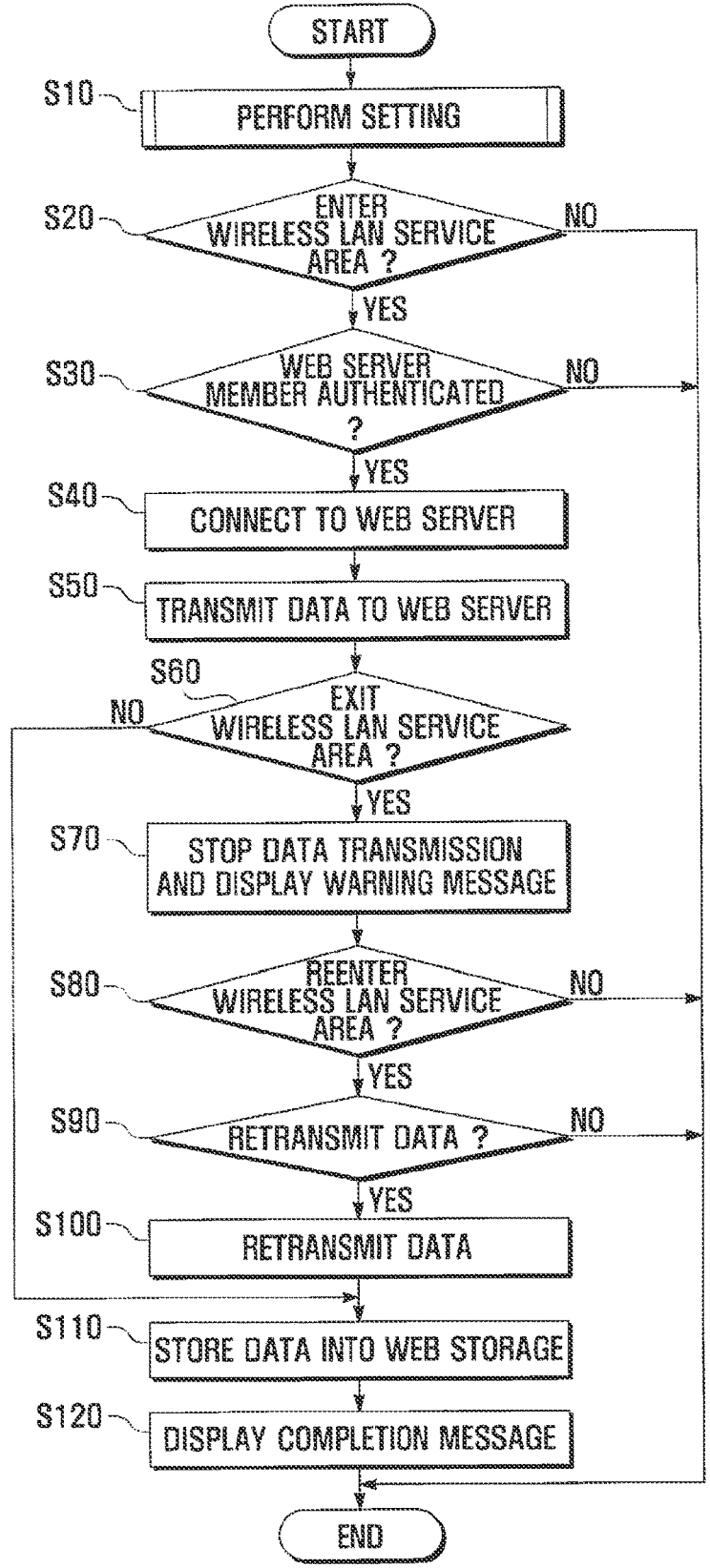
FIG. 4 is a flowchart of a method for storing data into a web storage using a wireless LAN service according to an exemplary embodiment of the present invention.

Referring to FIG. 4, the control unit performs setting of the mobile terminal 100 and the web server 300 so as to transmit data of the mobile terminal 100 to the web server 300 (S10). Step S10 of performing setting is described in detail with reference to FIG. 5 as follows.

Figure 5:
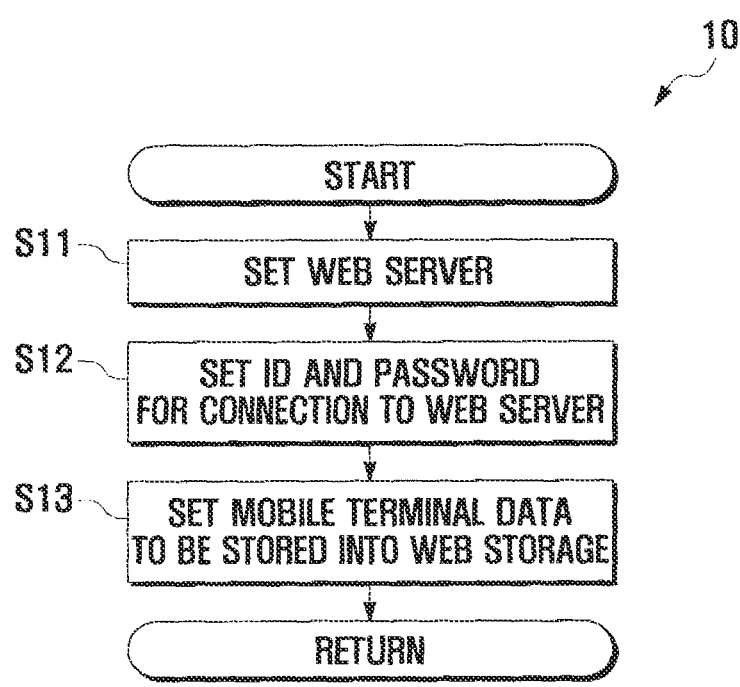
FIG. 5 is a detailed flowchart of a service-setting step for using a wireless LAN service according to an exemplary embodiment of the present invention.

Referring to FIG. 5, the control unit 130 sets synchronization of the web server 300 and the mobile terminal 100 including the hot key, the callback URL, a URL address, etc., so as to store specific data stored in the storage unit 150 of the mobile terminal 100 into the web storage 320 provided by the web server 300, in step S11. The control unit 130 sets the user ID and password for connection to the web server 300 set at step S11, in step S12, then sets the specific data stored in the storage unit 150 of the mobile terminal 100 to be stored into the web storage 150, in step S13. The specific data may be directory data, moving image data, still image data or MP3 music data. The specific data may be set by the user whenever the mobile terminal 100 enters the wireless LAN service area, or may be set previously by the user to be automatically executed when the mobile terminal 100 enters the wireless LAN service area. Preferably, performing setting at step S10 is executed by the setting unit 131 of the control unit 130.

The control unit 130 senses whether the mobile terminal 100 enters the wireless LAN service area having the wireless connection device 200, in step S20. Preferably, the sensing is executed by the sensing unit 132 of the control unit 130.

If the control unit 130 senses that the mobile terminal 100 enters the wireless LAN service area, the control unit 130 transmits the user ID and password set for connection to the web server 300 to determine whether the user of the mobile terminal 100 is authenticated by the web server 300 as a member of the web server 300 in step S30. Member authentication may be obtained by inputting the ID and password whenever the mobile terminal 100 is connected to the web server 300, or may be obtained when synchronization of the mobile terminal 100 with the web server 300 is executed, and thus in the case of reconnection, the authentication step may be omitted.

If the user is authenticated as a member of the web server 300, the control unit 130 is connected to the web server 300 in step S40.

The control unit 130 then transmits the set specific data of the mobile terminal 100 to the web server 300 through a broadband network in step S50. Preferably, the transmission of the data is executed by the transmitting unit 133 of the control unit 130.

The sensing unit 132 of the control unit 130 senses whether the mobile terminal exits the wireless LAN service area during data transmission in step S60. If the mobile terminal 100 exits the wireless LAN service area during data transmission, the control unit 130 controls the display unit 140 to display a warning message notifying that data transmission is stopped and controls the transmission unit 133 to stop data transmission to the web server 300 in step S70.

The sensing unit 132 of the control unit 130 senses whether the mobile terminal 100 reenters the wireless LAN service area in step S80. If the mobile terminal 100 reenters the wireless LAN service area, the control unit 130 determines whether to retransmit the data whose transmission was stopped in step S90. If the data is to be retransmitted, the transmission unit 133 retransmits the data from a stopped portion of the data or from the start of the data in step S100.

If the mobile terminal 100 does not exit the wireless LAN service area at step S60, the control unit 100 continues transmission of the set specific data to the web server 300 through a broadband network, and the process continues at step S110.

The web storage 320 of the web server 300 stores the data transmitted from the transmitting unit 133 of the mobile terminal 100 by control of the control module 310 in step S110.

When the data transmitted from the transmitting unit 133 of the mobile terminal 100 to the web server 300 is completely stored into the web storage 320, the control unit 130 controls the display unit 140 to display a storage completion message in step S120.

As described above, the present invention has an effect of expanding a storage space for storing mobile terminal data to a web storage, thereby reducing a limitation of the storage space.

The present invention also has an effect of storing data of a mobile terminal into a web storage without requiring a connecting cable between the mobile terminal and a PC, thereby overcoming a problem of limited space and equipment.

Further, the present invention has an effect of storing data of a mobile terminal into a web storage in a wireless LAN service area, thereby reducing costs rendered in connection to a wireless Internet.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A mobile terminal comprising:
    a memory;
    a display;
    a transceiver; and
    a processor configured to:
        control the memory to store a setting indicating whether still images stored in the mobile terminal are to be transmitted to a web server via a wireless local area network (LAN) if the mobile terminal enters a wireless LAN service area, and
        control, if the setting indicates that the still images stored in the mobile terminal are to be transmitted to the web server via the wireless LAN, the transceiver to transmit the still images stored in the mobile terminal to the web server via the wireless LAN if the mobile terminal enters the wireless LAN service area, and
        control the display to provide an indication of a status of the transmission including a notification concerning stopping of transmission if the mobile terminal exits the wireless LAN service area before transmission is complete, and a message allowing a user to select whether transmission of the still images should restart from a stopped position or from a beginning position if the mobile terminal re-enters the wireless LAN service area.

2. The mobile terminal of claim 1, further comprising:
    a second transceiver configured to communicate on a mobile communications network.

3. The mobile terminal of claim 1, wherein the transceiver is configured to communicate on a mobile communications network.

4. The mobile terminal of claim 1, wherein the processor is further configured to:
provide at least one first user interface by which the user selects the setting, and
provide at least one second user interface by which the user inputs a user identification and a password associated with a user account of the web server which stores the still images.

5. The mobile terminal of claim 4, wherein the mobile terminal uses the user identification and the password to connect to, and be authenticated by, the web server which stores the still images for the mobile terminal.

6. The mobile terminal of claim 1, wherein, if the transmission of the still images is stopped before the transmission is complete, a stopped portion where the transmission stopped is stored in the memory of the mobile terminal.

7. The mobile terminal of claim 1, wherein the processor is further configured to:
control the transceiver to stop, if the mobile terminal exits the wireless LAN service area during the transmission of the still images, the transmission of the still images,
control the transceiver to re-start, if the mobile terminal re-enters the wireless LAN service area, the transmission of the still images.

8. A method for a mobile terminal, comprising:
receiving, from a user, a user identification and a password, where the user identification and the password are associated with a user account and a web server which stores data associated with the user account;
receiving, from the user, a first selection of a first setting indicating whether still images stored in the mobile terminal are to be stored in the web server associated with the user account;
receiving, from the user, a second selection of a second setting indicating, if the first setting indicates that the still images stored in a memory of the mobile terminal are also to be stored in the web server, whether the still images stored in the memory of the mobile terminal are to be transmitted to the web server via a wireless local area network (LAN) if the mobile terminal enters a wireless LAN service area; and
in case that the second setting indicates that the still images stored in the mobile terminal are to be transmitted to the web server via the wireless LAN if the mobile terminal enters the wireless LAN service area:
transmitting the still images stored in the mobile terminal to the web server via the wireless LAN if the mobile terminal enters a service area of the wireless LAN; and
displaying an indication of the status of the transmission including a notification concerning stopping of transmission if the mobile terminal exits the wireless LAN service area before transmission is complete, and a message allowing a user to select whether transmission of the still images should restart from a stopped position or from a beginning position if the mobile terminal re-enters the wireless LAN service area.

9. The method of claim 8, further comprising:
storing the user identification and the password.

10. The method of claim 8, further comprising:
storing the first setting and the second setting.

11. The method of claim 8, wherein transmitting the still images stored in the mobile terminal to the web server via the wireless LAN of the wireless LAN service area comprises:
transmitting the user identification and the password to connect to, and be authenticated by, the web server associated with the user account.

12. The method of claim 8, further comprising:
stopping, if the mobile terminal exits the wireless LAN service area during the transmission of the still images, the transmission of the still images;
re-starting, if the mobile terminal re-enters the wireless LAN service area, the transmission of the still images; and
if the transmission of the still images is stopped before the transmission is complete, storing, by the mobile terminal, a stopped portion where the transmission stopped.

13. The method of claim 12, wherein displaying the indication of the status of the transmission comprises:
displaying a completion message if the transmission of the still images to the web server is complete.

* * * * *